United States Patent [19]

Takahashi et al.

[11] Patent Number: 5,010,642

[45] Date of Patent: Apr. 30, 1991

[54] METHOD AND APPARATUS FOR MAKING A FLAT WIRING HARNESS

[75] Inventors: Mineo Takahashi; Susumu Nakayama; Osamu Yamashima; Satoshi Suzuki; Toshihiko Harada; Keiji Aiso, all of Shizuoka, Japan

[73] Assignee: Yazaki Corporation, Tokyo, Japan

[21] Appl. No.: 450,968

[22] Filed: Dec. 15, 1989

[30] Foreign Application Priority Data

Dec. 27, 1988 [JP] Japan ................................ 63-327959

[51] Int. Cl.[5] ........................ H01R 43/00; B23P 19/00

[52] U.S. Cl. ........................................ 29/868; 29/745; 29/749; 29/753; 156/47; 140/147; 174/72 A; 174/117 F

[58] Field of Search .......................... 174/117 F, 72 A; 156/47, 48, 436; 29/868, 861, 755, 745, 749, 857, 748, 33 F, 566.3, 872, 753; 140/147

[56] References Cited

U.S. PATENT DOCUMENTS

| | | | |
|---|---|---|---|
| 3,459,878 | 8/1969 | Gressitt et al. | 29/872 X |
| 3,663,739 | 5/1972 | Chevier | 174/167 F X |
| 3,936,344 | 2/1976 | Ball et al. | 156/47 X |
| 4,048,710 | 9/1977 | Nijman | 29/753 X |
| 4,071,393 | 1/1978 | Amphlett | 156/436 X |
| 4,125,137 | 11/1978 | Shatto, Jr. | 140/147 |
| 4,132,251 | 1/1979 | Folk et al. | 140/147 |
| 4,144,633 | 3/1979 | Tucci | 29/753 X |
| 4,182,029 | 1/1980 | Nijman | 29/749 |
| 4,210,773 | 7/1980 | Haley et al. | 174/72 A |
| 4,210,999 | 7/1980 | Smith | 29/857 |
| 4,275,495 | 6/1981 | Boutcher, Jr. et al. | 29/753 X |
| 4,308,660 | 1/1982 | Brown et al. | 29/753 X |
| 4,378,823 | 4/1983 | Normann et al. | 140/147 X |
| 4,381,208 | 4/1983 | Baverstock | 174/72 A X |
| 4,412,566 | 11/1983 | Huffnagle et al. | 140/147 |
| 4,420,020 | 12/1983 | McGeary et al. | 140/147 |
| 4,441,251 | 4/1984 | Grubb | 29/861 |
| 4,493,147 | 1/1985 | Bakermans | 29/748 X |
| 4,766,668 | 8/1988 | Urness et al. | 29/749 |

FOREIGN PATENT DOCUMENTS

| | | | |
|---|---|---|---|
| 0041815 | 12/1981 | European Pat. Off. . | |
| 97414 | 1/1984 | European Pat. Off. | 174/117 F |
| 53-55789 | 5/1978 | Japan . | |
| 53-72189 | 6/1978 | Japan . | |
| 55-122309 | 9/1980 | Japan . | |
| 59-16211 | 1/1984 | Japan . | |
| 63-34808 | 2/1988 | Japan . | |
| 1403431 | 8/1975 | United Kingdom | 29/868 |
| 1417209 | 12/1975 | United Kingdom | 174/117 F |

*Primary Examiner*—Carl J. Arbes
*Attorney, Agent, or Firm*—Armstrong, Nikaido, Marmelstein, Kubovcik & Murray

[57] ABSTRACT

The method of making a flat wiring harness consists of a pre-shaping process, a shaping process, and a wire bonding process. In the pre-shaping process, the intertwined wires are combed to be smoothed and straightened out and are pushed by a press block into parallelly arranged grooves in a series of longitudinally lined jigs and kept therein by a cover. In the shaping process, the group of wires thus laid in parallel lines in a series of the grooved jigs are shaped into a desired pattern of the flat wiring harness by moving any desired grooved jigs horizontally along guide slots formed in a holder plate, on which the grooved jigs and associated components are mounted. In the bonding process, the shaped flat wire group is applied with adhesive on one side through a screen which is patterned according to the shape of a final flat wiring harness. As the adhesive hardens, the wires are bonded together and a flat wiring harness of a desired two-dimensional shape is obtained. This method allows the wires of different sizes to be bonded together. It also permits the formation of branch wires at any locations from the trunk.

11 Claims, 11 Drawing Sheets

METHOD AND APPARATUS FOR MAKING A FLAT WIRING HARNESS

BACKGROUND OF THE INVENTION

1. Field of the Invention

The present invention relates to a method and apparatus for making a flat wiring harness which can make effective use of narrow automotive space.

2. Description of the Prior Art

Flat wiring harnesses generally have a construction, as shown in FIG. 17*a*, in which a plurality of covered wires a are parallelly arranged and secured together like a flat plate.

Such a straight wiring harness, however, is not practical. Actual installation situations often require, as shown in FIG. 17*b*, that the wiring harness have a trunk portion b and a plurality of branches c1, c2, . . . shooting out from the trunk and that these groups of wires be formed into various shapes such as curves, L and Y shapes. In other words, the wiring harness must have a two-dimensional shape that fits into the complex shape of space in the automobiles.

The following two facts ma be cited as the reasons that the conventional flat wiring harnesses have failed to find general use.

(1) It has been difficult to lay a large number of twisted wires in a parallel arrangement and keep them in a desired two-dimensional pattern of wiring harness.

(2) There has been no established technique to bond together a group of wires in a particular shape at low cost, easily and reliably.

In a conventional method of arranging a plurality of wires in parallel like a flat plate, the following process has been taken. As shown in FIG. 18*a*, alignment guides f are positioned at both ends of a wire arrangement table d with an opening e cut between the ends. Then wires a are passed through the guides f one at a time (Japanese Patent Application Kokai Publication No. 122309/1980).

With this method, however, gaps are formed between the wires by the guides f. And when the arranged wires are secured together by insulating tapes q as shown in FIG. 18*b*, the product's width becomes inevitably large. This runs counter to the demands for smaller size.

There are very few reports published so far regarding a flat wiring harness, which consists of a plurality of parallel wires bonded together that are formed into a desired two-dimensional pattern corresponding to the shape of the automotive space. One example available is the Japanese Utility Model Reg. Application Kokai Publication No. 72189/1978, in which as shown in FIG. 19*a* wires a are laid parallel on a back member (vinyl sheet) i one wire at a time and then hot air is blown to fuse them together.

Other methods of bonding wires together, in addition to the one shown in FIG. 19*a*, are illustrated in FIGS. 19*b* to 19*d*. FIG. 19*b* represents a method in which upper and lower dies j, k are used to mold the wires together using resin (Japanese Patent Application Kokai Publication No. 55789/1978); FIG. 19*c* illustrates a method in which adhesive is applied from the orifice m of nozzle l onto the wires a (Japanese Patent Application Kokai Publication No. 16211/1984); and FIG. 19*d* shows a method in which a group of wires a are secured together by fiber materials n, n', in a plate-like form (Japanese Patent Application Kokai Publication No. 34808/1988).

The methods shown in FIGS. 19*a* to 19*d*, however, tend to increase the complexity of the apparatus and therefore the cost. They are also restricted in application to only simple configurations of wiring harness such as straight line, and with these methods it is very difficult to form curved or branched harnesses.

SUMMARY OF THE INVENTION

This invention has been accomplished to overcome the above-mentioned drawbacks.

It is therefore an object of this invention to provide a method and apparatus for making a flat wiring harness which solve the above problems experienced with the conventional techniques and which can produce a flat wiring harness with a two-dimensional shape that fits in a narrow and complicated space in an automobile.

To achieve the above objective, this invention divides into the following two sub-processes the process of laying twisted wires in a parallel arrangement according to the shape of wiring harness and maintaining them in that condition.

(1) a pre-shaping process to lay wires in straight parallel configuration.

(2) a shaping process to form the parallelly arranged straight wires into the desired shape of wiring harness.

The difficulty in securely bonding together the group of wires that are maintained in a particular shape patterned on the final wiring harness product is overcome by using a thermoplastic resin as an adhesive or adhesive sheet. That is, the pre-shaping process of arranging a plurality of wires in parallel and straight lines can be achieved by first unraveling intertwined wires by comb teeth, pushing one or two or more smoothed-out wires into each straight wire accommodating groove in a grooved jig, and putting a cover on the grooved jig to maintain the laid wires in position.

Forming the wires laid on the grooved jigs into a desired shape of wiring harness is accomplished by lining a plurality of grooved jigs end to end on a plate, each grooved jig having wire accommodating grooves; unraveling intertwined wires by comb teeth; pushing one, two or more smoothed-out wires into each wire accommodating groove extending in straight line from one end of the plurality of grooved jigs to another; putting a cover on the plurality of grooved jigs to maintain the laid wires in the grooved jigs; and moving any desired grooved jigs chosen from among the plurality of grooved jigs parallelly to the plate to form into a desired shape of wiring harness the wires which were laid in the straight and parallel arrangement in the grooved jigs.

Bonding and fixing together of the wires after the shaping process is accomplished by applying an adhesive through a screen onto a plurality of wires arranged parallel and flat and formed into the desired shape of wiring harness; and hardening the applied adhesive to securely bond the wires together and thereby form a flat wiring harness. The method of securely bonding wires together also consists in forming a pre-sheet on a sheet receptor plate by screen or metal printing so that the pre-sheet has a shape corresponding to that of a group of parallelly arranged wires patterned on the desired shape of the wiring harness; heating the pre-sheet to form a paste sheet; and pressing the paste sheet against one side of the flat wire group to transfer the paste sheet onto the surface of the flat wire group, thereby securely bonding the wires together.

The apparatus for performing the pre-shaping process comprises: a grooved jig having wire accommodating grooves defined by a plurality of parallelly arranged partition plates; a comb having teeth, the comb teeth facing the wire accommodating grooves, the comb teeth being spaced apart at the same pitch or interval as that of the partition plates; a wire support rod positioned in front of the comb; and a wire press block and a cover plate, both installed behind the comb; whereby a group of members consisting of the comb, wire support rod, wire press block and cover plate are parallelly movable relative to the grooved jig or both groups of members are parallelly movable relative to each other, a plurality of wires lifted to a predetermined height by the wire support rod are combed by the comb teeth to be unraveled and smoothed out, the smoothed-out wires are pushed into the wire accommodating grooves by the wire press block, and then the cover plate is placed on the grooved jig, in which the wires have been laid in parallel straight lines, to keep the laid wires in position.

And the group of wires thus installed in the grooved jigs can be formed into the desired shape of wiring harness by lining the wire-loaded grooved jigs lengthwise on the plate, and moving any desired grooved jigs parallelly to the plate along predetermined paths.

These and other objects and features of this invention will now be described by referring to the attached drawings that illustrate the preferred embodiments of the invention.

DESCRIPTION OF THE PREFERRED EMBODIMENTS

Now, the present invention will be explained by dividing it into a pre-shaping process, a shaping process, and a wire bonding process. Each of these processes as well as the details of the pre-shaping method are described in connection with the preferred embodiments by referring to the attached drawings.

Preprocessing before Shaping

Figure 1:
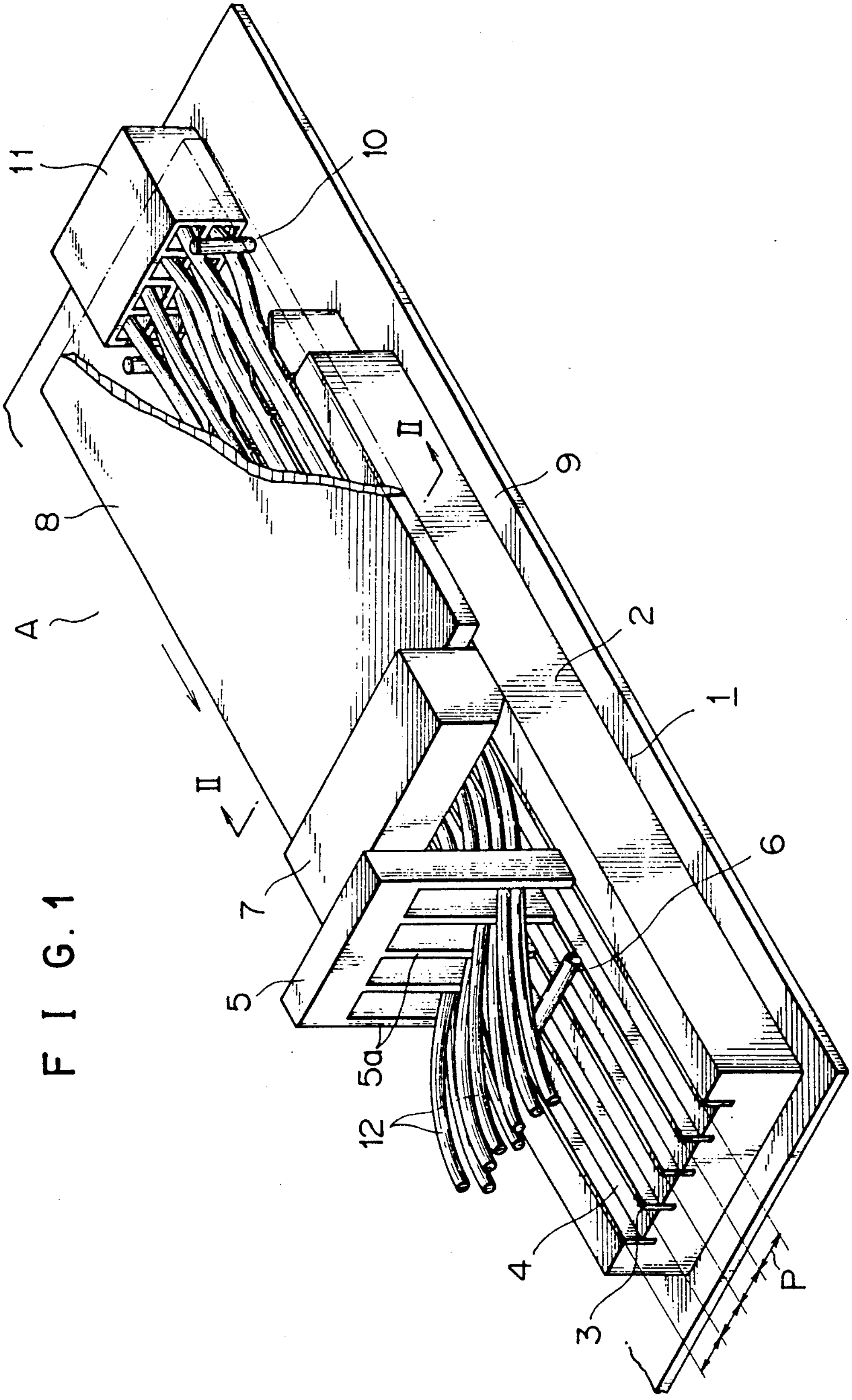
FIG. 1 is a perspective view of a basic preshaping device as one embodiment of this invention.
Figures 2, 3, 4, 5, 9, 10A, 10B:
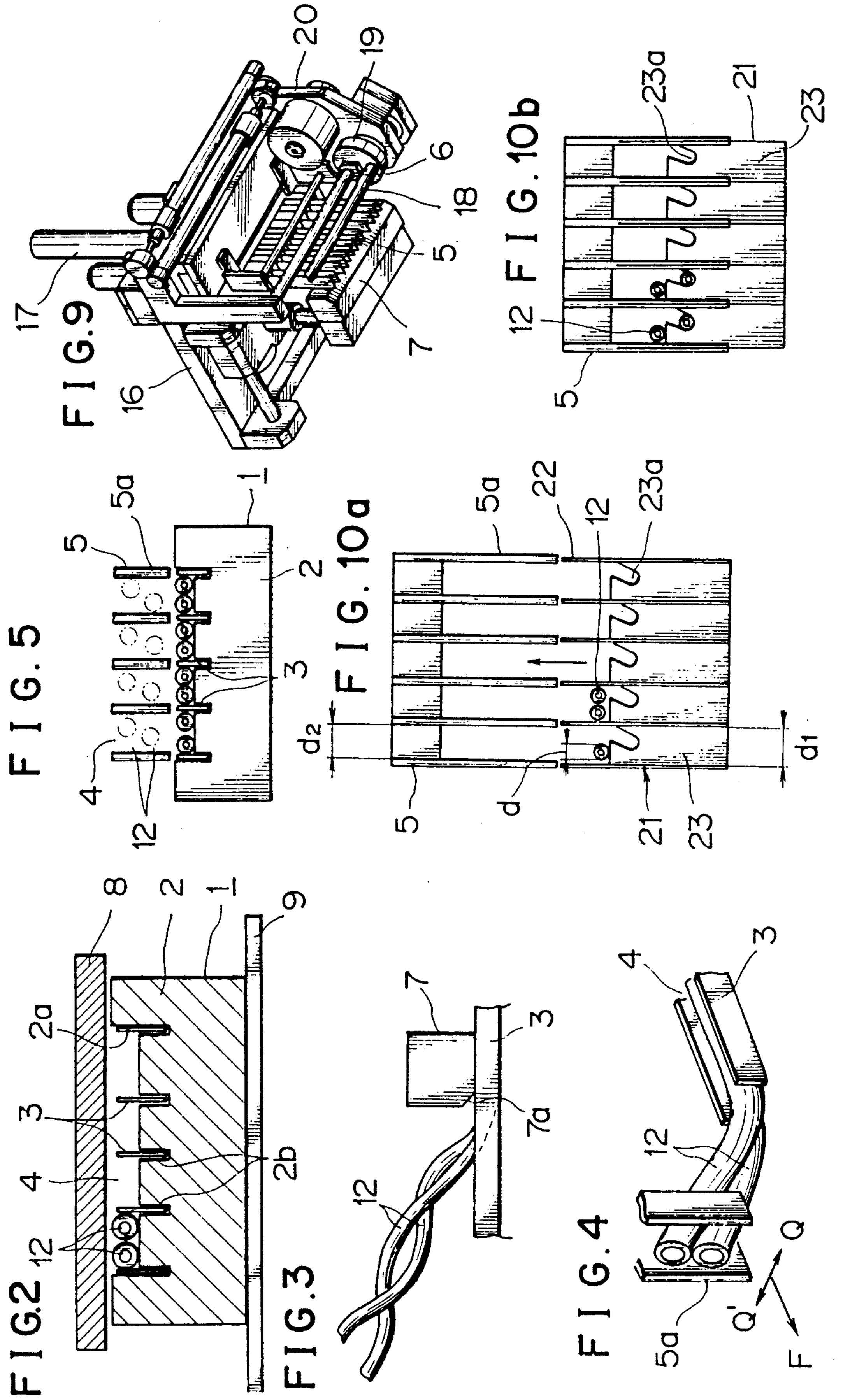
FIG. 2 is a cross-sectional view taken along the line II—II of FIG. 1.
FIG. 3 is a simplified view showing how a wire press block 7 of FIG. 1 works.
FIG. 4 and FIG. 5 are simplified views showing how a comb teeth 5*a* and a wire accommodating groove 4 work in combination.
FIG. 9 is a view as seen from the direction of arrow Y in FIG. 8.
FIGS. 10*a* and 10*b* are simplified views showing a comb 5 and a wire lift 21 of FIG. 8 in operation.

In FIG. 1 and FIG. 2, a reference symbol A denotes the preprocessing device, which comprises a grooved jig 1, a comb 5, a wire support rod 6, a wire press block 7, and a cover plate 8.

The grooved jig 1 consists of a jig body 2 and a plurality of partition plates 3. The jig body 2 is a rectangular parallelepiped with a plurality of slits 2*b* formed in a recess 2*a* on the top surface of the jig body at a predetermined pitch P. The partition plates 3 are slidably fitted into the slits 2*b* to form wire accommodating grooves 4.

The comb 5 is erected on the upper surface of the grooved jig 1. On the front side of the comb 5 there is provided the wire support rod 6. On the rear side the wire press block 7 and the cover plate 8 are installed.

The comb 5 has a plurality of teeth 5*a*, which project at the same pitch P as that of the partition plates 3. The comb teeth 5*a* each are preferably formed into a wide plate-like shape, rather than a simple bar.

It is also desirable that the surface of the recess 2*a* of the grooved jig 1 be lined with such a material as fluoride resin that has a small friction coefficient. It is recommended that the partition plates 3 employ a flexible resilient material such as a stainless steel strip to facilitate the wire bending process to be described later.

The comb 5, wire support rod 6 and wire press block 7 can be moved with respect to the grooved jig 1 in the direction of arrow. Instead, it is also possible to construct the apparatus so that the base 9 of the grooved jig 1 can be moved in the opposite direction.

The method of wire preprocessing is described in the following.

First, as shown in FIG. 1, a plurality of wires 12 are crimped at one end with terminals (not shown), which are then inserted into a connector housing 11. The connector housing 11 is then set against connector receptor pins 10. The wires 12 are inserted between the comb teeth 5*a*, 5*a*, two wires in each tooth-to-tooth space, and are held at a desired height by using the wire support rod 6.

In this state, the wire support rod 6, comb 5, and wire press block 7 are simultaneously moved in the direction of arrow. The wires 12 are combed, straightened out and at the same time pushed into the wire accommodating grooves 4. The wires 12 thus installed in the grooves 4 are now covered with the cover plate 8 and kept in this condition.

In this way, on the recess 2*a* of the grooved jig 1 the wires 12 are separated by the partition plates 3 into groups of two, which are straightened out and arranged in parallel with each other. The number of wires that are installed in each wire accommodating groove 4 and inserted between the comb teeth 5a, 5a is preferably two. The reason is given below.

Figure 18A:
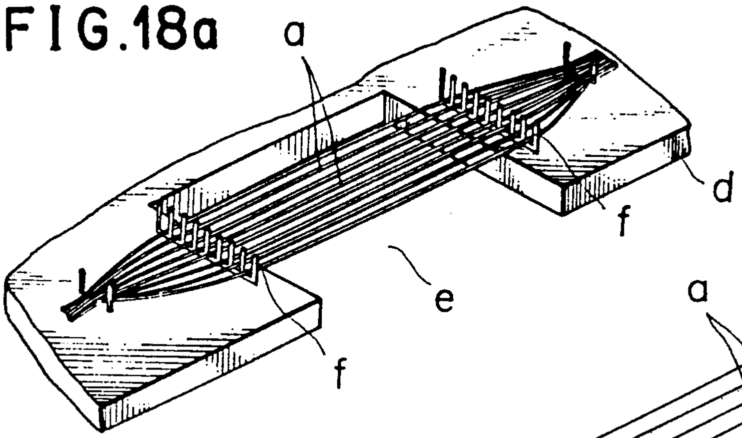
FIGS. 18*a* and 18*b* are simplified views showing conventional methods of making flat wiring harnesses.
Figure 18B:
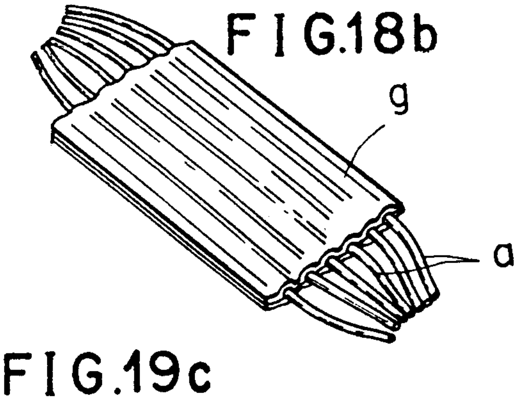
Figure 19B:
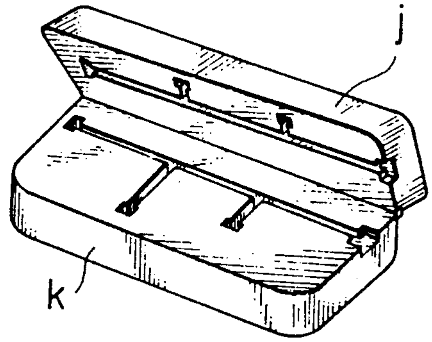
Figure 19C:
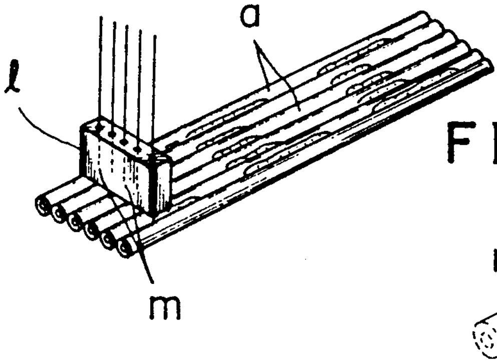
Figure 19D:
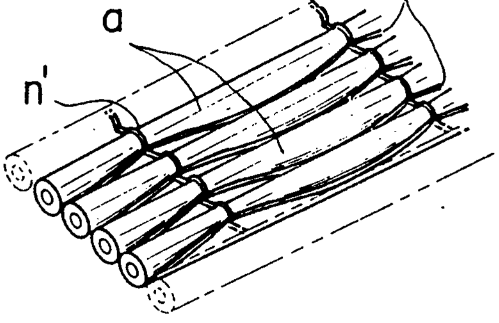

(1) Laying single wires in each of the wire accommodating grooves 4 will increase the wire intervals, as experienced with the conventional method shown in FIG. 18b (2) The single-wire arrangement can reduce the thickness of the partition plates 3. However, since the comb teeth 5a are applied with a greater force to disentangle the wires, they must have an adequate strength and rigidity. Therefore it is necessary to make the comb teeth 5a thicker than the partition plates 3. This will result in the disalignment in the pitch between the partition plates 3 and the comb teeth 5a.

(3) Three wires intertwined cannot be unraveled by the comb teeth 5a. The appropriate number of wires that are put in the tooth-to-tooth space is two or less.

(4) As shown in FIG. 3, the two wires can be pushed into the wire accommodating groove 4 while being unraveled by the wire press block 7.

(5) As shown in FIGS. 4 and 5, the tooth-to-tooth space of the comb can accommodate two wires 12 one upon the other, and the wire accommodating groove 4 can accept two wires abreast.

The comb teeth 5a are formed into a wide plate and, as shown in FIG. 4, a force F parallel to the plate surface is applied to the wires 12. Forces Q, Q' perpendicular to the force F smooth out the wires 12, which are relieved of twisting or bending and straightened out in parallel lines. This enables unraveling of the entangled wires 12 before they reach the comb teeth 5a.

As shown in FIG. 3, two wires 12 that are twisted together can be unraveled and pushed into the wire accommodating groove 4 by the wire press block 7. Although the wire press block 7 is shown as a square bar with a guide taper 7a on a side facing the untreated wires 12, it may be formed as a roll.

Pre-shaping Process

Figure 6:
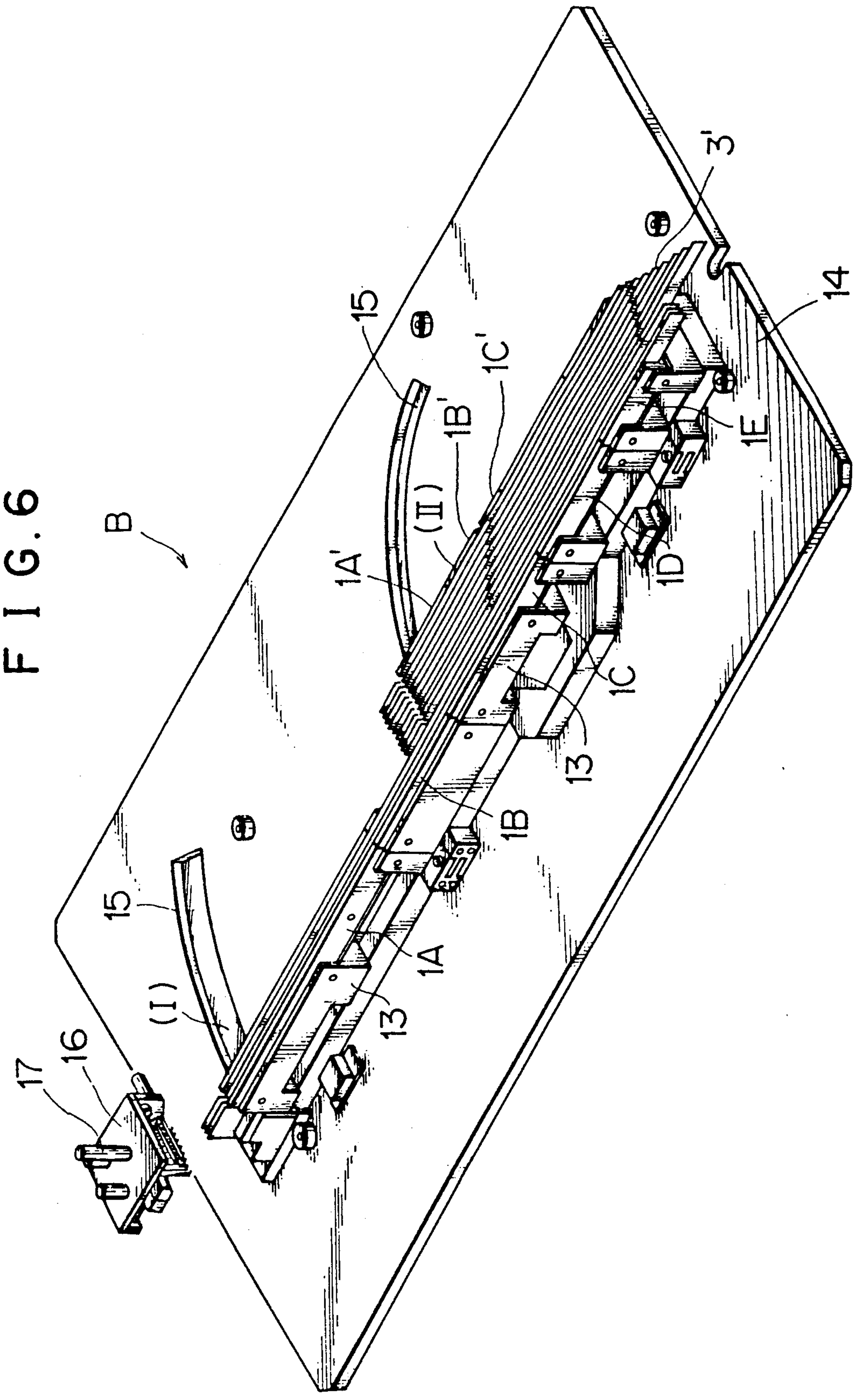
FIG. 6 is a simplified perspective view showing a pre-shaping process and a shaping device.
Figure 7:
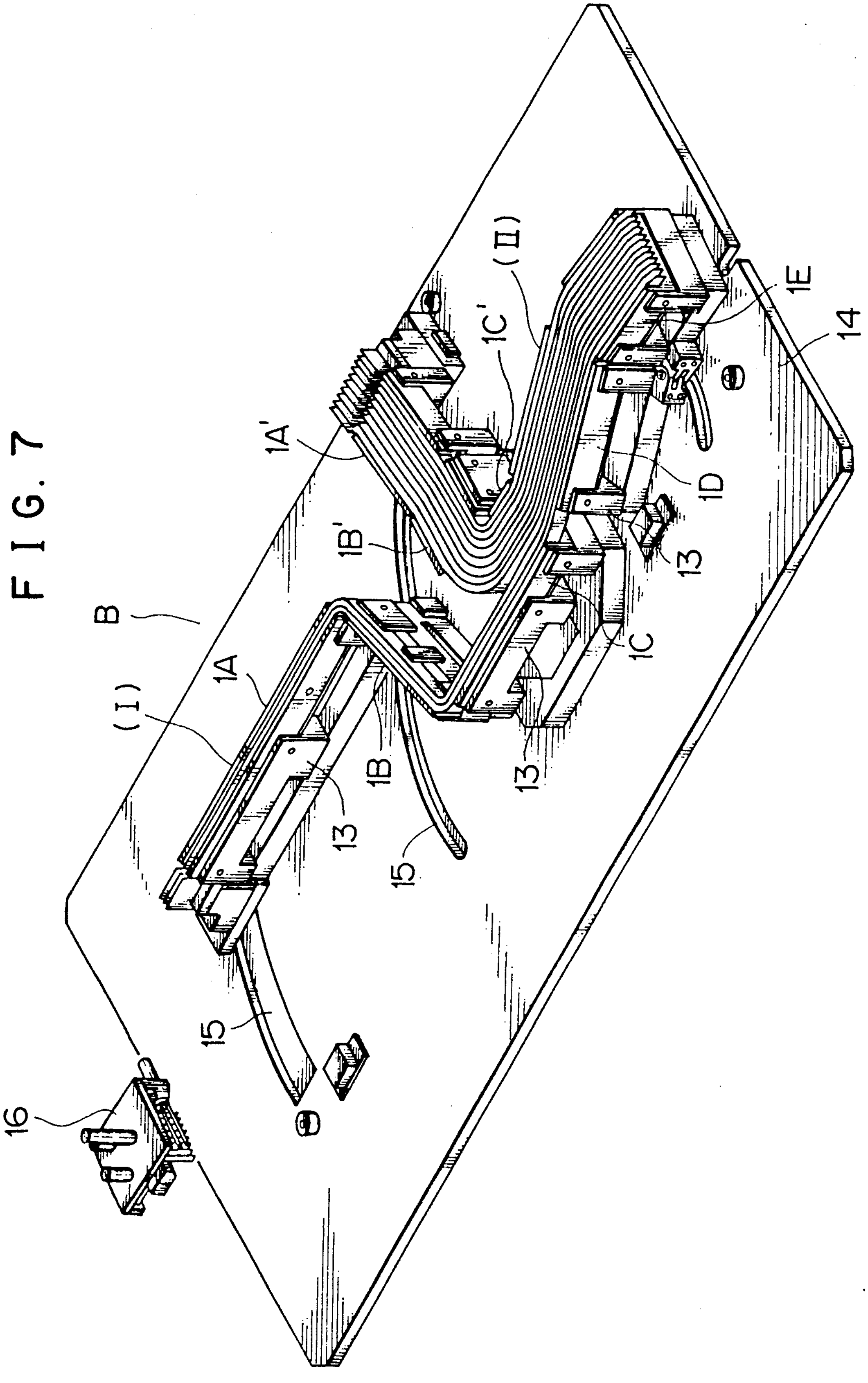
FIG. 7 is a simplified perspective view showing the shaping device in operation.

In FIG. 6 and FIG. 7, reference symbol B denotes a wire shaping apparatus that doubles as a pre-shaping device, and has two rows of wire shaping block (I) and (II). The shaping block (I) consists of a plurality of grooved jigs 1A, 1B, 1C, . . . , lined up end to end, which are manufactured individually. At the intermediate portion of and in parallel with the wire shaping block (I), there is provided a small wire shaping block (II), which consists of grooved jigs 1A', 1B', 1C', . . . for forming branch portions of the wiring harness.

The individual grooved jigs 1A, 1B, 1C, . . . lined lengthwise have differing lengths but has the same structure as the grooved jig 1 of FIG. 1. The partition plates 3 are formed continuous from one end of each wire shaping block (I), (II) to another. The partition plates for each block are fixed, at one end (left end in FIG. 6), to the grooved jig 1A, 1A' respectively by pins not shown. The other ends are left loose and project from the grooved jig as shown at 3'. The projected portions 3' of the partition plates 3 constitute a guide to form a bend in the flat wiring harness, as described later.

The grooved jigs 1A, 1B, 1C, . . . of each wire shaping block (I), (II) are supported by a plurality of jig holders 13. The jig holders 13 are each connected to actuators such as hydraulic cylinders not shown so that they can be moved on, and parallelly to, a holder plate 14 along guide slots 15 formed in the holder plate 14. At one end of the wire shaping block (I), a wire laying head 16 is provided vertically movable.

Figure 8:
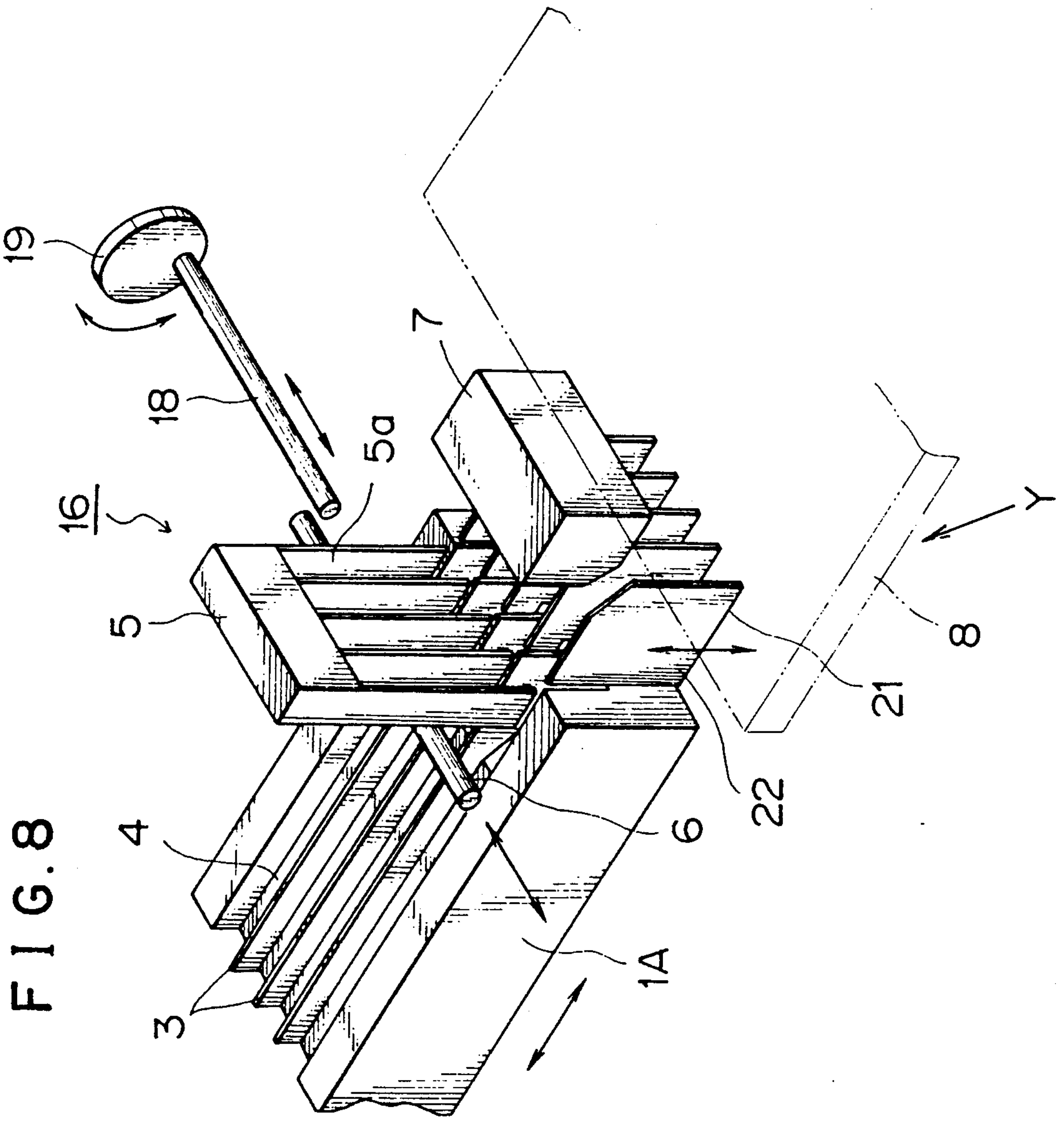
FIG. 8 is an enlarged perspective view of an essential portion of a wire laying head 16 as shown FIG. 6.
Figure 11C:
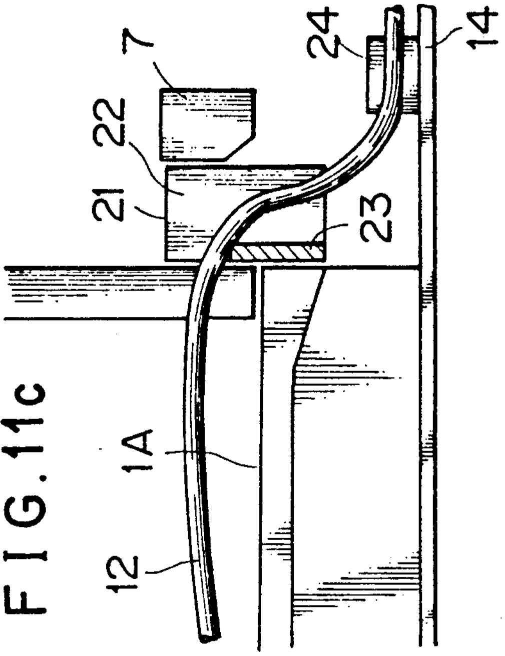
FIGS. 11*a* through 11*i* are simplified views showing the comb 5, wire lift 21, wire support rod 6 and wire sub-support rod 18 in operation.
Figure 11D:
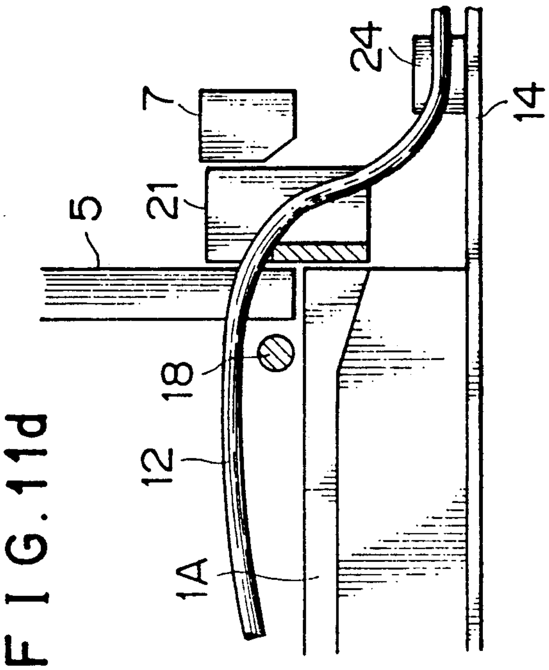
Figure 11A:
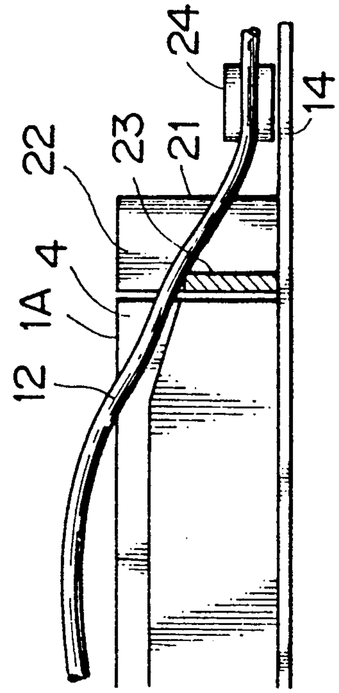
Figure 11B:
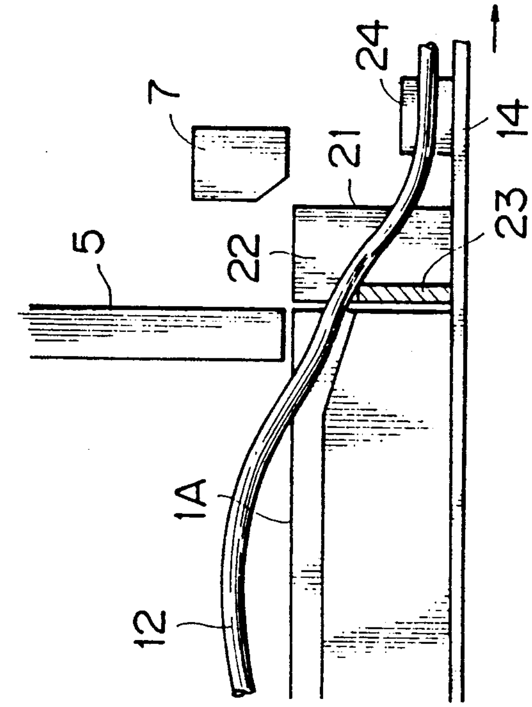
Figure 11E:
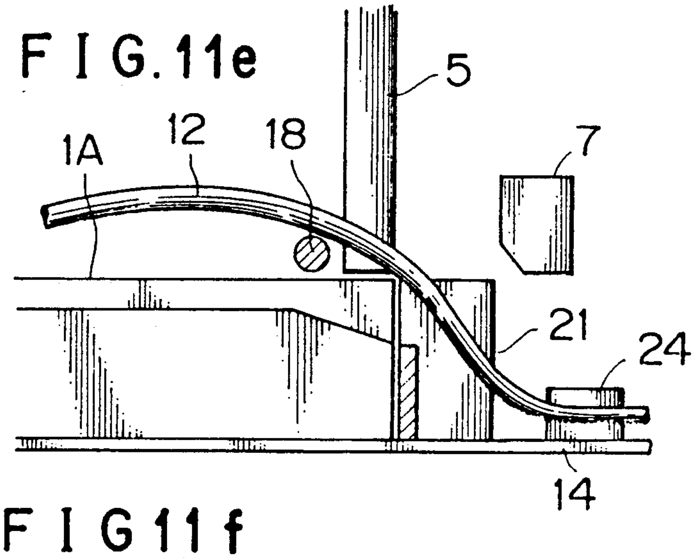
Figure 11F:
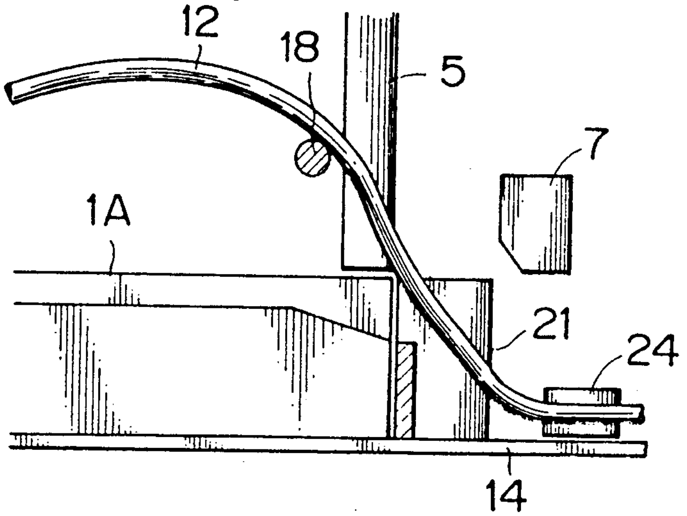
Figure 11G:
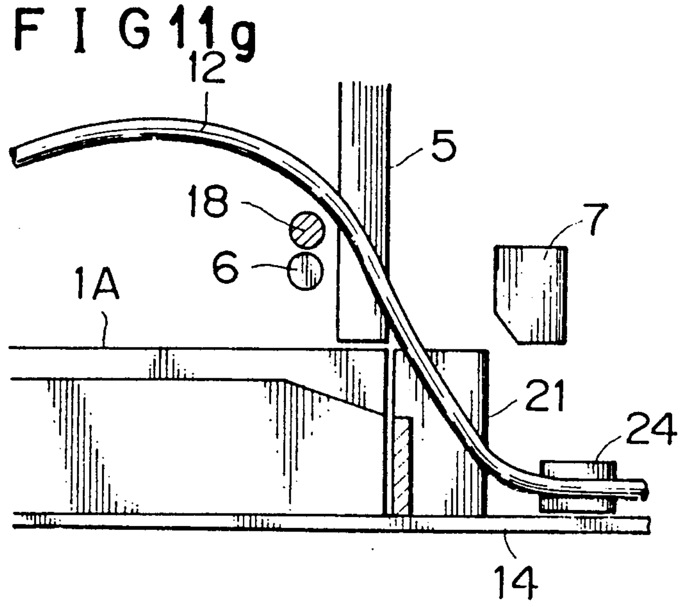
Figure 11H:
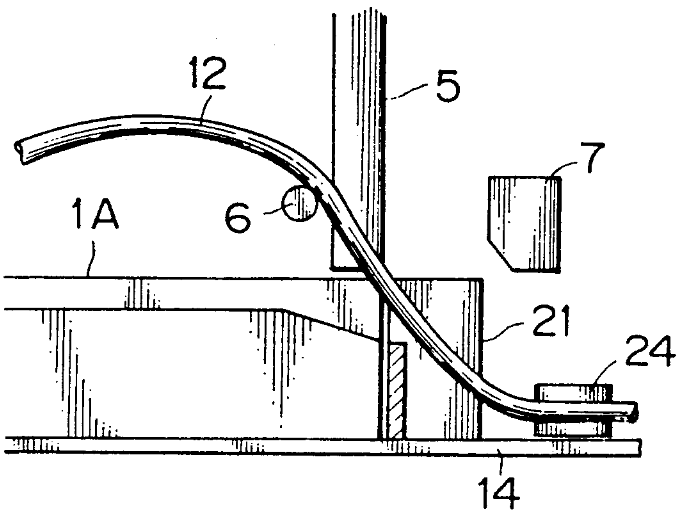
Figure 11I:
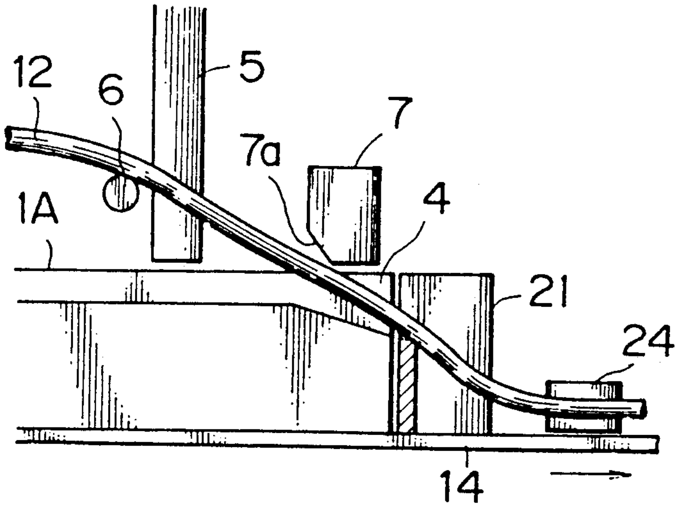

In FIG. 8 and FIG. 9, the wire laying head 16 is disposed close to the end of the grooved jig IA and can be moved up or down by a cylinder 17. The wire laying head 16 has at its underside a comb 5, a wire support rod 6 in front of the comb 5 and a wire press block 7 behind the comb 5. These constituent members 5, 6, 7 are the same as those shown in FIG. 1. The wire laying head 16 is further provided with another wire support rod 18 or a sub-support rod.

The wire support rod 6 and the wire sub-support rod 18 are passed through a rotary mounting plate 19 a the center and at the peripheral portion thereof, respectively, in such a manner that they are slidable in the axial direction or in the lateral direction when viewed from the front. The rotary mounting plate 19 is rotatably mounted on a side plate 20 that projects vertically downwardly from the undersurface of the wire laying head 16. Therefore, the two support rods 6, 18 can be advanced and retracted in the directions of arrows shown in FIG. 8. The wire sub-support rod 18 is moved up and down by the rotation of the rotary mounting plate 19.

On the underside of the wire laying head 16, a wire lift 21 is provided vertically movable between the comb 5 and the wire press block 7. The wire lift 21, as shown in FIGS. 10a and 10b, has support pieces 23 installed between blades 22. The support pieces 23 each are formed with an escape groove 23a at their upper ends. The blades 22 are spaced at the same pitch of the comb teeth 5a.

If we let the outer diameter of the wire 12 be d, the width of the support piece 23 be $d_1$, and the inner dimension between the comb teeth 5a, 5a be $d_2$, then the wire lift 21 is formed so as to satisfy the following relationships:

$$d_1 = 2d,\ 2d > d_2$$

Now, by referring to FIGS. 11a through 11i, we will explain about the processing performed before wire shaping which uses the wire laying head 16 and the wire lift 21.

(a) First, two wires 12 are installed at the end of the grooved jig 1A (wire accommodating groove (4) and also inserted between the blades 22 of the wire lift 21. The ends of the wires 12 are held immovable by the clamp 24. The clamp 24 may be replaced by the connector receptor pins 10 and the connector housing 11 as shown in FIG. 1.

(b) The holder plate 14 is moved in the direction of arrow to set the comb 5 and wire press block 7 of the wire laying head 16 in a preset position.

(c) The wire lift 21 is moved up to transfer the wires 12 to the comb 5. As shown in FIG. 10a and 10b, the interval of comb teeth 5a is smaller than two times the outer diameter of the wire 12, so that as the support piece 23 rises, one of the wires 12 slips into the escape groove 23a in the support piece 23. In this way, two wires 12 can smoothly be transferred into the space between the comb teeth.

(d) The wire sub-support rod 18 now advances in front of the comb 5 and below the wires 12 that were raised by the wire lift 21.

(e), (f)

The wire lift 21 is lowered and the wire sub-support rod 18 is raised by the rotation of the rotary mounting plate 19 (FIG. 8) to push up the wires to the uppermost part of the comb teeth 5*a*.

(g) The wire support rod 6 advances below the sub-support rod 18.

(h) The wire sub-support rod 18 is retracted (see FIG. 8) and the wires 12 are supported by the wire support rod 6. The wires 12 are now ready to be smoothed out.

(i) The holder plate 14 is moved in the direction of arrow to push the wires 12 into the wire accommodating groove 4 of the grooved jig 1A.

This process is the same as the wire pre-shaping process shown in FIG. 1. In this way, the wires 12 are pushed into the grooved jigs 1A, 1B, 1C, . . . in that order. With this wire installation in the grooved jigs completed, the pre-shaping process for the shaping block (I) of FIG. 6 is finished.

The pre-shaping process for the small wire shaping block (II) is performed in a similar way. The operation of replacing the sub-support rod 18 with the support rod 6, as shown in FIGS. 11*c* through 11*h*, is intended to enable the wire laying to be started halfway, as in the case of the small wire shaping block (II). This permits the pre-shaping process to be performed continuously without any interruption.

Shaping Process

The process of shaping the wires into the desired pattern of wiring harness is described below.

In FIG. 7, a group of grooved jigs 1A, 1B, 1C, . . . for the shaping block (I) and another group of grooved jigs 1A', 1B', 1C', . . . for the shaping block (II) are inclined or bent at the joints of the jigs and formed into a desired shape such as an L shape. This shaping can be made by horizontally moving the jig holders 13 along the guide grooves 15 by the actuator.

Figure 12:
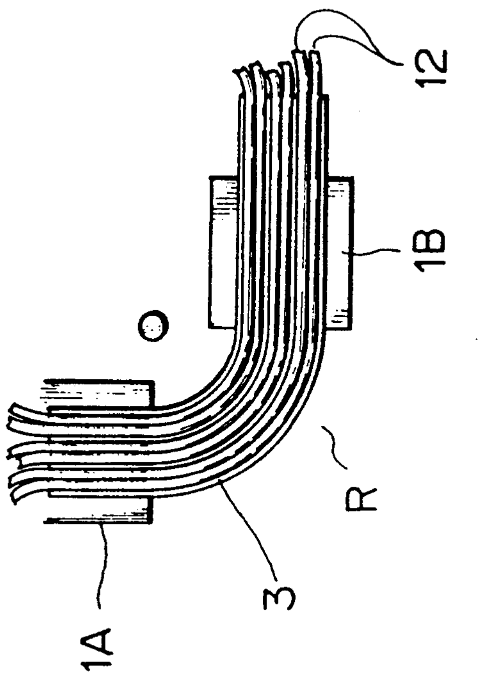
FIG. 12 is a simplified view showing partition plates 3 of FIG. 6 in operation.

For example, the grooved jigs 1A and 1B are bent almost at right angles. At the bent portion the two jigs 1A and 1B are separated. As for the partition plates 3, they have resiliency and are slidably installed in the slits 2*b* (see FIG. 2). Thus, the partition plates 3 are smoothly curved while securely holding each two laid wires 12 between the plates 3, 3, as shown in FIG. 12. The projected portions 3' of the partition plates 3 (see FIG. 6) are provided for the formation of the smooth bend.

In this way, the plurality of wires arranged in straight lines are formed into the desired shape of wiring harness and then retained in this condition.

Wire Bonding Process

Figure 13A:
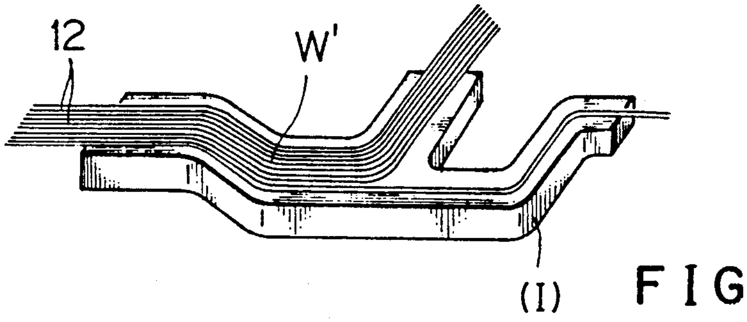
FIGS. 13*a* to 13*c* are simplified views showing the process of bonding the wires together according to this invention.
Figure 13B:
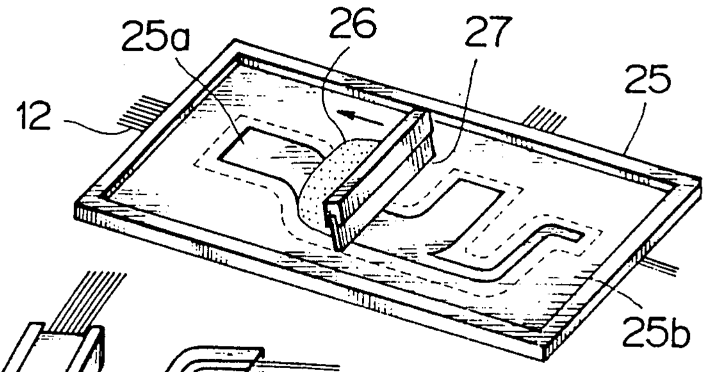

In FIG. 13*a*, reference symbol W' represents a preproduct of flat wiring harness that is formed into the final shape on the shaping block (I). A screen 25 is placed on the preproduct of wiring harness W„ as shown in FIG. 13*b*. The screen 25 is blinded except at the harness pattern 25*a*. An adequate amount of adhesive 26 made up mainly of thermoplastic resin is put on the screen 25 and a squeegee 27 is stroked to squeeze the adhesive 26 through the screen 25.

As a result, the adhesive 26 is squeezed through the screen 25 and applied to one side of the group of wires 12 that constitute the preproduct of wiring harness W'. The adhesive temperature is set according to the kind of adhesive 26.

Figure 13C:
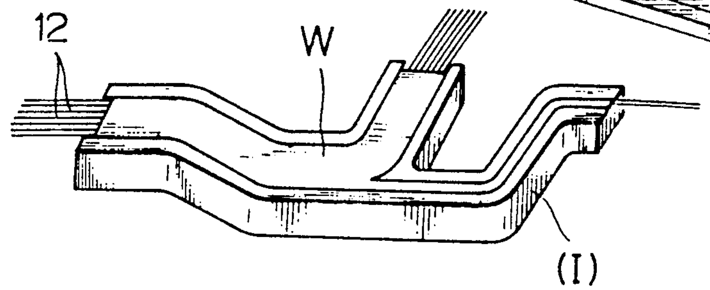

As shown in FIG. 13*c*, as the adhesive 26 hardens, the group of wires 12 arranged horizontally close together are securely bonded together to form the final product of flat wiring harness W. This product is taken out of the shaping block (I).

Figure 14:
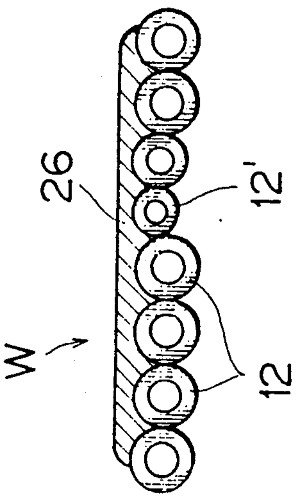
FIG. 14 is a cross-sectional view of a flat wiring harness obtained in the above process.

The mesh size of the screen 25 is preferably 15-60 mesh and more preferably 20-50 mesh, larger than those commonly used on the screen printing. This allows application of adhesive to an uneven surface as when the wiring harness preproduct consists of wires 12, 12' of different diameters, as shown in FIG. 14.

The adhesive 26 preferably has the viscosity in the range of 400-1200 poise. The reason is that this level of viscosity prevents the adhesive placed on the screen 25 from flowing on its own but allows it to be squeezed easily through the screen 25 only when worked by the squeegee 27. As preferred adhesive 26, such materials as polyvinyl chloride paste, polyvinyl chloride bonding agent and hot melt adhesive may be used because of their advantages of high bonding performance, low cost, good stability, and the freedom in setting a desired viscosity.

Figure 15:
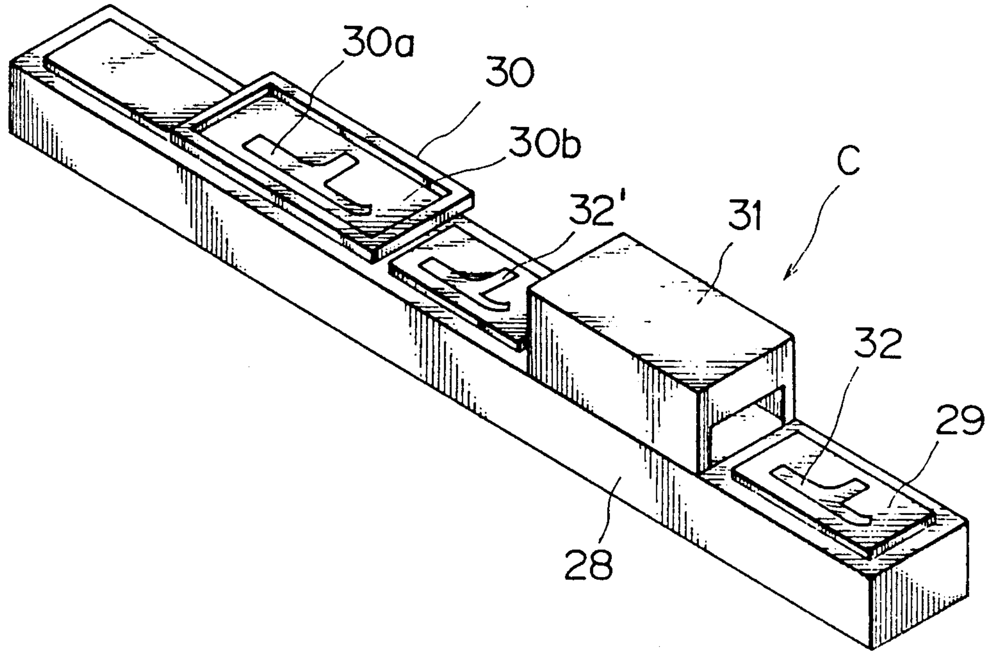
FIG. 15 is a perspective view of a device for making a transfer adhesive sheet according to this invention.

Referring to FIG. 15 and FIGS. 16*a* to 16*c*, we will describe other method of bonding the wires. In FIG. 15, reference symbol C denotes a device for making a transfer adhesive sheet. The device C consists of a table 28, a sheet receptor plate 29, a screen 30, and a heating furnace 31. The table 28 has an endless chain (not shown) to move the sheet receptor plate 29 intermittently. The screen 30, like the preceding screen 25, is blinded at 30*b* except for the wiring harness pattern 30*a*. Using this screen 30, a pre-sheet 32' is printed on the sheet receptor plate 29. The pre-sheet 32' has the same pattern as that of the preproduct of flat wiring harness W, (see FIG. 13*a*). For printing, an adhesive paste with high viscosity or fine powder of thermoplastic resin such as polyvinyl chloride resin or polyvinyl chloride foam are used.

The pre-sheet 32' is passed through the furnace 31 to produce a paste sheet 32 of hot gel.

Figure 16A:
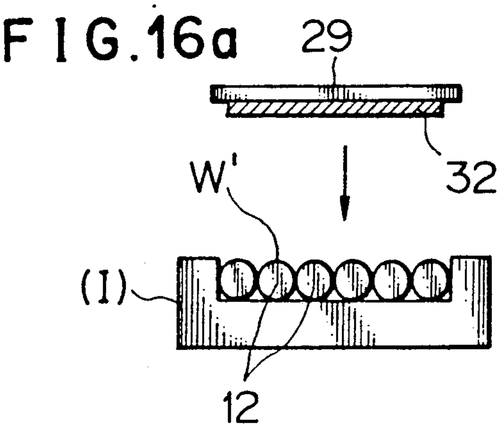
FIGS. 16*a* to 16*c* is a simplified view showing the process of bonding the wires together using the above transfer adhesive sheet.
Figure 16B:
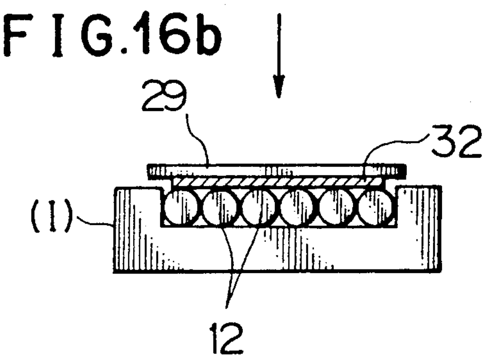
Figure 16C:
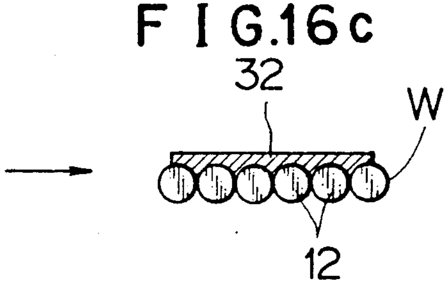
Figure 17A:
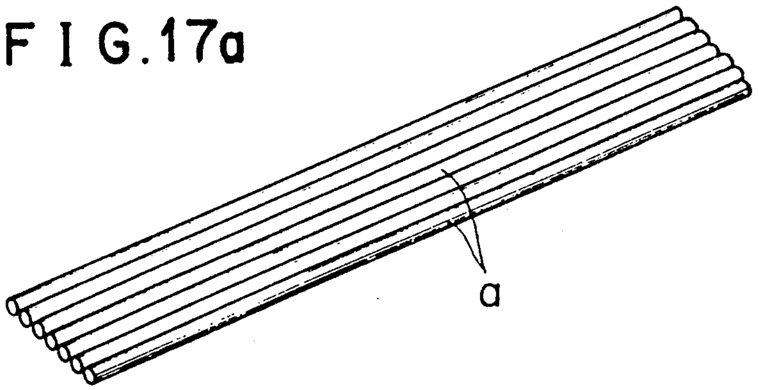
FIGS. 17*a* and 17*b* are perspective views showing conventional flat wiring harnesses.
Figure 17B:
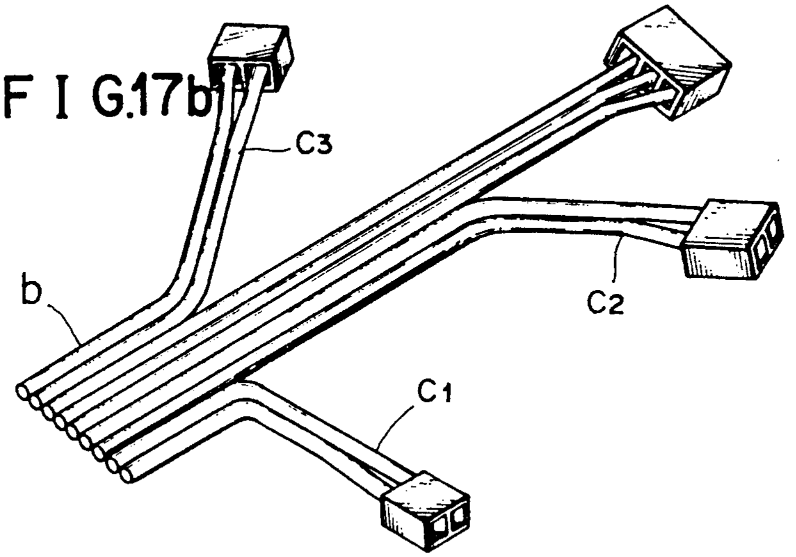
Figure 19A:
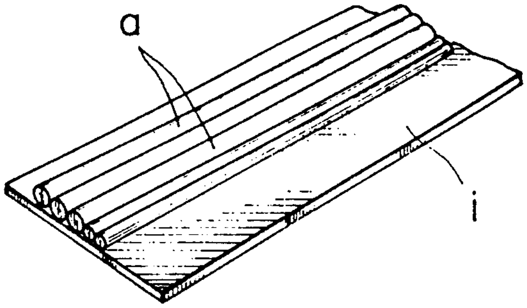
FIGS. 19*a* to 19*d* are simplified views showing conventional methods of bonding wires together.

Then, as shown in FIGS. 16*a* to 16*c*, the sheet receptor plate 29 is inverted and placed on the preproduct of wiring harness W' on the shaping block (I) (or the grooved jigs 1A, 1B, . . . ) (FIG. 16*a*). And the paste sheet 32 is pressed to be transferred onto the preproduct of wiring harness W, (FIG. 16*b*). Now, a complete product of the flat wiring harness W is obtained in which the group of wires 12 are bonded together by the paste sheet 32 (FIG. 16*c*). The transfer of paste sheet 32 can be done at low temperatures of 50 to 100° C., unlike the direct screen printing of FIG. 13*b*.

This invention provides the following functions. As shown in FIGS. 3 to 5, with an appropriate number of wires to be installed in each wire accommodating groove 4 and inserted in each space between the comb teeth 5*a* selected, it is possible to smoothly unravel intertwined wires and at the same time press and lay a large number of straightened wires 12 into the wire accommodating grooves in a close parallel arrangement. With the cover plate 8 put on the laid wires, the parallel arrangement of the wires can be maintained.

As shown in FIGS. 6 and 7, the wire shaping blocks (I) and (II) are formed of a plurality of grooved jigs, the former consisting of a group of jigs 1A, 1B, 1C, . . . and the latter consisting of a group of jigs 1A', 1B„ 1C', . . . By simply moving the grooved jigs horizontally, it is possible to form the group of closely and parallelly arranged wires into a desired shape of wiring harness.

Two or more groups of wires arranged according to the shape of the wiring harness are directly applied with adhesive through screen, as shown in FIGS. 13a to 13c. As the adhesive hardens, a flat wiring harness can easily be obtained which has the group of wires bonded together and shaped into a two-dimensional pattern that will fit into the narrow space in the automotive.

ADVANTAGES OF THE INVENTION

As mentioned above, this invention offers the following advantages.

(1) Ordinary covered wires can be used in making the flat wiring harness.

(2) Wires of different sizes can be combined in the same wiring harness (FIG. 14).

(3) The process of laying wires in a flat configuration according to the shape of the final wiring harness is divided into two sub-processes: (i) a pre-shaping process of installing the wires in a straight and parallel arrangement; and (ii) a shaping process of forming the parallel wires into the pattern of wiring harness. The process therefore is made up of simpler sub-processes and can be performed easily. This permits the wire group to be curved or bent into various shapes and also allows the branching from the flat portion (FIGS. 6 and 7).

(4) Since the wires arranged according to the shape of wiring harness are parallelly and horizontally close together, they can easily be bonded together (FIG. 14 and FIGS. 16a to 16c).

(5) It is therefore possible to mass-produce the flat wiring harnesses in desired shapes that will fit into narrow spaces in the automotive.

What is claimed is:

1. A method of making a flat wiring harness comprising the steps of:

unraveling intertwined wires by parallel arranged comb teeth;

pushing at least one smoothed-out wire into each straight wire accommodating groove in a grooved jig; and putting a cover on the grooved jig to maintain the laid wires in position.

2. A method of making a flat wiring harness comprising the steps of:

lining a plurality of grooved jigs end to end on a plate, each grooved jig having wire accommodating grooves;

unraveling intertwined wires by comb teeth;

pushing at least one smoothed-out wire into each wire accommodating groove extending in a straight line from one end of the plurality of grooved jigs to another;

putting a cover on the plurality of grooved jigs to maintain the laid wires int he grooved jigs; and moving selected grooved jigs from among the plurality of grooved jigs parallel to the plate to form into a desired shape of wiring harness the wires which were laid in the straight and parallel pattern in the grooved jigs.

3. A method of making a flat wiring harness comprising the steps of:

applying an adhesive through a screen having a harness pattern and blinded except at said harness pattern onto a plurality of wires arranged parallel and flat and formed into the desired shape of wiring harness; and hardening the applied adhesive to securely bond the wires together and thereby form a flat wiring harness.

4. An apparatus for making a flat wiring harness comprising:

a base, a grooved jig supported by said base and having a plurality of parallel partition plates defining longitudinally extending wire accommodating grooves therebetween, a comb having a plurality of teeth spaced apart at the same pitch as said partition plates and movable to a position where each of said comb teeth are vertically aligned with and opposed to one of said partition plates to separate between adjacent ones of said comb teeth at least one wire of a plurality of intertwined wires having one end fixed at one end of said base, a wire support rod movable to a position traversing said wire accommodating grooves between said plurality of wires and said grooves on one side of said comb when said comb is in said position with said comb teeth vertically aligned with said partition plates, a wire press block traversing said wire accommodating grooves on a side of said comb opposite from said wire support rod when said comb is in said position with said comb teeth vertically aligned with said partition plates, and at least one of said grooved jig and a combination of said comb, said wire support rod and said wire press block are movable in the direction of said axially extending wire accommodating grooves relative to the other of said grooved jig and said combination, whereby said wire support rod lifts said plurality of wires from said grooved jig, said comb and said fixed end of said plurality of wires are moved apart with said comb teeth unravelling and separating said wires between adjacent ones of said comb teeth from the wires in other adjacent ones of said comb teeth, said wire press block moves along said wires accommodating grooves and presses the wire between adjacent ones of said comb teeth into the wire accommodating groove defined by the partition plates vertically aligned with said adjacent ones of said comb teeth and said cover plate is placed on said grooved jig to keep said wires in said wire accommodating grooves.

5. An apparatus for making a flat wiring harness as set forth in claim 4, wherein the partition plates are slidably installed on the grooved jig.

6. An apparatus for making a flat wiring harness as set forth in claim 4, wherein the comb teeth are formed into a wide plate-like shape.

7. An apparatus for making a flat wiring harness as set forth in claim 4, wherein the inner dimension between the partition plates is almost two times the outer diameter of the wire.

8. An apparatus for making a flat wiring harness as set forth in claim 4, wherein the wire press block has a square cross section and has a tapered wire guide joining a block surface facing said comb and a block surface facing said grooved jig.

9. An apparatus for making a flat wiring harness as set forth in any one of claims 4, 5, 6, 7 or 8, wherein the comb, the wire support rod and the wire press block are each supported for movement relative to said grooved jig and said wire accommodating grooves by a wire laying head which is mounted for vertical movement with respect to said base.

10. An apparatus for making a flat wiring harness as set forth in any one of claims 4, 5, 6, 7 or 8, wherein a wire lift is vertically movably supported by said base at one end of said grooved jig between the comb and the wire press block, the wire lift having support pieces between a plurality of blades which are spaced t the same pitch as the pitch of the comb teeth and vertically aligned with the comb teeth, and each support piece has a wire escape groove at an upper end, whereby said wire lift is vertically movable to lift wires provided between adjacent blades to a position between aligned adjacent ones of said comb teeth.

11. An apparatus for making a flat wiring harness as set forth in any one of claims 4, 5, 6, 7 or 8, wherein a plurality of the grooved jigs are aligned lengthwise on the base, and selected grooved jigs are mounted to be movable in a plane parallel to the base to provide a harness pattern with at least a plurality of wires bent to extend in a direction different from other wires in said harness pattern.

* * * * *